United States Patent [19]

Yamamoto et al.

[11] Patent Number: 5,310,513
[45] Date of Patent: May 10, 1994

[54] METHOD FOR MANUFACTURING A CROSS-LINKED THERMOPLASTIC RESIN FOAM

[75] Inventors: Syunji Yamamoto; Takaaki Kemmotsu, both of Hiratsuka; Mitsunori Okada, Yokohama; Makoto Hashimoto, Ayase, all of Japan

[73] Assignee: Furukawa Electric Co., Ltd., Tokyo, Japan

[21] Appl. No.: 927,848

[22] Filed: Aug. 10, 1992

Related U.S. Application Data

[63] Continuation-in-part of Ser. No. 658,349, Feb. 20, 1991, abandoned.

[30] Foreign Application Priority Data

Sep. 17, 1990 [JP] Japan .................................. 2-246724

[51] Int. Cl.$^5$ .......................................... B29C 67/22
[52] U.S. Cl. ........................................ 264/54; 264/55; 264/DIG. 18
[58] Field of Search ................ 264/46.1, 51, 53, 54, 264/55, DIG. 18

[56] References Cited

U.S. PATENT DOCUMENTS

| | | | |
|---|---|---|---|
| 3,458,608 | 7/1969 | Russell et al. | 264/55 |
| 3,819,784 | 6/1974 | Hasama et al. | 264/55 |
| 3,879,505 | 4/1975 | Boutillier et al. | 264/54 |
| 4,151,238 | 4/1979 | Ziemek et al. | 264/45.5 |
| 4,366,263 | 12/1982 | Sato et al. | 264/53 |
| 4,552,708 | 11/1985 | Kimura et al. | 264/53 |
| 4,585,605 | 4/1986 | Kaduta et al. | 264/54 |
| 4,671,910 | 6/1981 | Fuhrmann | 264/54 |
| 4,952,352 | 8/1990 | Shin | 264/51 |

FOREIGN PATENT DOCUMENTS

| | | |
|---|---|---|
| 45-29381 | 9/1970 | Japan . |
| 45-40436 | 12/1970 | Japan . |
| 58-134719 | 8/1983 | Japan . |
| 60-11329 | 1/1985 | Japan . |
| 60-51416 | 11/1985 | Japan . |
| 2-283421 | 11/1990 | Japan . |

*Primary Examiner*—Allan R. Kuhns
*Attorney, Agent, or Firm*—Frishauf, Holtz, Goodman & Woodward

[57] ABSTRACT

There are provided a method and an apparatus for continuously manufacturing a cross-linked thermoplastic resin foam arranged as follows. A resin composition, which contains at least a thermoplastic resin, a foaming agent, and a cross-linking agent, is extruded into a closed die, which includes at least a molding region, a heating region, and a cooling region, continuously arranged in the order named. The resin composition is molded into a desired shape in the molding region of the die, and is then heated in the heating region to decompose the cross-linking agent and also to decompose at least part of the foaming agent so that cell nuclei are produced, thereby forming a partially foamed product. In the cooling region of the die, the partially foamed product is cooled to a temperature lower than the softening point thereof to be increased in rigidity, and is extruded to the outside of the die while being subjected to a damping force as it moves in the cooling region. The partially foamed product, extruded from the die, is heated under the atmospheric pressure to expand the foaming agent fully, whereupon a final product is obtained.

5 Claims, 7 Drawing Sheets

METHOD FOR MANUFACTURING A CROSS-LINKED THERMOPLASTIC RESIN FOAM

This application is a continuation-in-part of Ser. No. 07/658,349, filed Feb. 20, 1991, now abandoned.

BACKGROUND OF THE INVENTION

1. Field of the Invention

The present invention relates to a method and an apparatus for manufacturing a cross-linked thermoplastic resin foam, and more specifically, to a method and an apparatus for stably continuously manufacturing a thick cross-linked thermoplastic resin foam having a smooth surface and fine cells with uniform diameters.

2. Description of the Related Art

Conventionally known are various methods for manufacturing foams by the use of a resin composition which contains a thermoplastic resin, a foaming agent, and a cross-linking agent, as essential ingredients. According to one of these methods, for example, the resin composition is molded into a predetermined shape, such as a sheet, and the resulting molded product is heat-treated under atmospheric pressure, first to decompose the cross-linking agent therein, thereby promoting cross-linking of the thermoplastic resin, and then to decompose the foaming agent, thereby expanding the cross-linked product. In this method, however, the cross-linking and forming are effected in the atmospheric-pressure, high-temperature atmosphere, so that the cells of the resulting foam are coarse and uneven in diameter. Moreover, the foam is deteriorated and made poorer in appearance due to oxidation of the resin composition, and it is hard to obtain a thick foam.

There have conventionally been proposed methods in which a closed pressing machine or die is loaded with such a resin composition as aforesaid, and the composition is heated and expanded under pressure (refer to Published Examined Japanese Patent Applications Nos. 45-40436, 46-2900 and 45-29381, and U.S. Pat. No. 4,671,910). According to these methods, in contrast with the method using the atmospheric-pressure, high-temperature atmosphere, a thick foam having fine uniform cells can be securely obtained. In these methods, however, the resin composition, which consists mainly of the thermoplastic resin compounded with cross-linking agent, and foaming agent, is cross-linked and expanded by being heated under pressure by means of the pressing machine or die. Originally based on the batch system, therefore, these methods can hardly be applied to series production. Thus, the productivity cannot be improved, and it is difficult to manufacture elongated foams due to restrictions on the shape of the pressing machine or die.

Some improved methods have been proposed to solve these problems of the batch system (refer to Published Examined Japanese Patent Application No. 60-51416, U.S. Pat. No. 4,552,708, and Published Unexamined Japanese Patent Application No. 60-11329). In the methods disclosed in Published Examined Japanese Patent Application No. 60-51416 and U.S. Pat. No. 4,552,708, the resin composition is continuously extruded from an extruder into an elongated landed die, which is connected to the extruder, so that a cross-linking reaction is advanced in the first-half stage of the elongated landed die, and gas produced by pyrolytically decomposing the foaming agent is retained in the molten resin composition by dissolution or the like in the second-half stage. Finally, the resin composition is continuously extruded into the atmosphere to be swollen. In order to retain the produced gas in the molten resin composition, a back pressure is applied to the resin composition by means of a throttle die which is located near the outlet of the landed die.

In the method disclosed in Published Unexamined Japanese Patent Application No. 60-11329, all processes, including complete cross-linking and complete decomposition of the foaming agent for the completion of expansion, are executed in an elongated landed die connected to an extruder. According to this method, therefore, the cross-linking and foaming can be finished before a cross-linked thermoplastic resin foam as a final product is continuously obtained from the landed die.

In the case of the methods disclosed in U.S. Pat. No. 4,552,708 and Published Unexamined Japanese Patent Applications No. 56-52548, No. 59-1232, No. 59-169825, No. 60-11329, No. 60-110424, No. 60-112418, No. 61-127324, No. 62-211122, No. 63-251437, No. 63-2514376, and No. 63-254142, a problem arises in that large-sized, complicated equipment is required to maintain high pressure. Further, the land die used must be significantly long because all necessary reactions must take place therein.

In the methods and apparatuses disclosed in U.S. Pat. No. 4,552,708 and Published Unexamined Japanese Patent Applications No. 59-169825, No. 60-11329, No. 61-127324, No. 62-211122, No. 62-211123, No. 63-2514376, No. 63-251437, and No. 63-254142, the cross-sectional area of the long land die is gradually increased toward the downstream end, to thereby gradually reduce the internal pressure of the die such that the volumetric expansion resulting from the expansion of the resin composition is permitted. Consequently, the shape of the long land die becomes more complicated toward the downstream end.

Due to a wide application of cross-linked foams, foams of various types, thick, thin, soft, or hard, are required and also there is a demand for a wide range of expansion ratios. It is therefore very useful to provide a method of manufacturing a cross-linked foam which method can flexibly meet various requirements. In this regard, in the case of the methods disclosed in U.S. Pat. No. 4,552,708 and Published Unexamined Japanese Patent Applications No. 56-52548, No. 59-1232, No. 59-169825, No. 60-11329, No. 60-110424, No. 60-112418, No. 61-127324, No. 62-211122, No. 63-251437, No. 63-2514376, and No. 63-254142, when the thickness or expansion ratio of cross-linked foams to be produced must be changed, the long land die in use must be replaced with another die having a different shape, followed by attachment of the die to the extruder. Further, in these methods, the resin composition in the die is passed through the throttle die while it is in a molten state or its temperature is higher than the softening point thereof. Since the resin composition which is in a molten state or at a temperature higher than the softening point and thus the flowing state of which is liable to be disturbed is forced into a narrow passage having a small cross-sectional area, a uniform flow of the resin composition is disturbed due to a strong shearing force acting thereon or stagnation occurs at the throttle die, even if lubricating oil is supplied to the inner surface of the die, thus making the manufacture of foams difficult.

The method disclosed in U.S. Pat. No. 4,552,708 is capable of continuous production of a foam having a fine cell structure. However, the foam obtained at the outlet of the die is a final product and gases and air account for almost the entire volume of the final product. Thus, the obtained foam, of which the volume is very large in comparison with the weight, must be transported, which leads to high transportation cost.

Disclosed in Published Unexamined Japanese Patent Application No. 58-134719, on the other hand, is a method for manufacturing a cross-linked thermoplastic resin foam, in which a polyolefin resin composition containing a cross-linking agent and a foaming agent is heated under a pressure of 1 to 10 kg/cm$^2$ to decompose parts of the cross-linking and foaming agents, thereby forming cell nuclei, and is then heated under the atmospheric pressure to decompose the remaining part of the foaming agent. This manufacturing method is based on technical concepts previously disclosed in Published Examined Japanese Patent Applications Nos. 45-40436, 46-2900, etc. According to the method disclosed in Japanese Patent Application No. 45-40436, for example, parts of the cross-linking agent and the foaming agent are decomposed by heating under a pressure of 5 to 50 kg/cm$^2$ to form cell nuclei.

In Published Unexamined Japanese Patent Application No. 58-134719, moreover, there is a description of continuous formation of cell nuclei. Described in these patent applications, however, are only the so-called batch system means as specific means for pressurizing the resin composition and the following methods as means for continuous pressurization. The batch system means include pressurization of the resin composition by means of compressed gas, autoclave, pressing machine, pressure-heating oven, etc. The continuous pressurization means include a method in which the resin composition is sandwiched between two parallel plates to be pressed thereby from both sides, and a method (load-curing) in which the resin composition is wound around a roll face and pressed from the opposite side by means of a belt. In both these continuous pressurization means, moreover, a gas pressure or mechanical force is externally applied to the resin composition to pressurize it. Thus, these pressurization means require a very special complicated pressurization mechanism. Since the resin composition is melted by heating when it is pressurized, moreover, the pressurization is believed to be very difficult. If the melted resin composition is pressed from both sides, for example, it collapses in its thickness direction, so that it is hard to maintain a fixed thickness.

In order to solve these problems, the inventors hereof developed earlier a method in which endless belts are arranged individually on the upper and lower inside surfaces of a die having a cooling region immediately following a heating region, and a resin composition is supported by means of the belts when it is continuously moved in the die. This method has already been proposed in Published Unexamined Japanese Patent Application No. 64-24728. According to this method, partial forms having cell nuclei therein can be manufactured in series. During the manufacture of the foams, however, the endless belts moving in the die are always pressed against the upper and lower inside surfaces of the die under a pressure of 11 to 50 kg/cm$^2$, so that the die surfaces and the belts wear out severely at their sliding contact portions. In consequence, the working life of the die and the endless belts is shortened, and the belts require a large-scale drive unit, inevitably entailing increased equipment cost.

Based on a discovery that decomposing a foaming agent in a closed space, such as a die, filled with a resin composition produces a high pressure of 1,000 kg/cm$^2$ or more, the inventors hereof developed a method in which cell nuclei are formed in the resin composition by utilizing this spontaneous pressure, without externally pressuring the composition by separate means. This method has already been proposed in Published Unexamined Japanese Patent Application No. 2-283421. According to this method, a choke bar is disposed at the outlet of a heating region in a die, and a damping force is applied to a partially foamed product in the heating region by controlling the cross-sectional area of the choke bar. By doing this, a pressure produced by the decomposition of a foaming agent in the heating region is increased to a desired level, and a cross-linking agent and the parts of foaming agent are decomposed in this state.

In the case of this method, the internal pressure of the die is increased and maintained by operating the choke bar to change the sectional area of the partially foamed product passing the choke bar, and the choke bar is arranged at each of the boundaries between the molding region and the heating region and between the heating region and the cooling region. Thus, when the partially foamed product passes the individual choke bars, it is still at high temperature and soft, and therefore, when the passage is narrowed by the choke bars, the flowing state of the partially foamed product is disturbed or stagnation occurs at the choke bars. Accordingly, the partially foamed product extruded from the die may be bent or its surface may be cracked, thus causing a difficulty in the manufacture of foams.

SUMMARY OF THE INVENTION

A primary object of the present invention is to provide a method and an apparatus for manufacturing a cross-linked thermoplastic resin foam, which enables stable series production of cross-linked thermoplastic resin foams having uniformly distributed fine cells with diameters of 200 μm or less.

Another object of the present invention is to provide a method and an apparatus for manufacturing a cross-linked thermoplastic resin foam by only additionally using simple equipment, without using an elongated landed die, and therefore, without complicating a configuration on the lower-course side of the landed die.

According to an aspect of the present invention, there is provided the following manufacturing method for a cross-linked thermoplastic resin foam. In this method, a resin composition, which contains at least a thermoplastic resin, a foaming agent, and a cross-linking agent, is extruded into a closed die, which includes at least a molding region, a heating region, and a cooling region, continuously arranged in the order named. The resin composition is molded into a desired shape in the molding region of the die, and is then heated in the heating region to decompose the cross-linking agent and also to decompose at least part of the foaming agent so that cells nuclei are produced, thereby forming a partially foamed product. In the cooling region of the die, the partially foamed product is cooled to a temperature lower than the softening point thereof to be increased in rigidity, and is extruded to the outside of the die while being subjected to a damping force as it moves in the cooling region. The partially foamed product, extruded from the die, is heated under atmospheric pressure to expand the foaming agent fully, whereupon a final product is obtained.

Preferably, the resin composition is partially expanded so that there is a relation $M1/M2 \leqq 0.525$ ($5.00 \geqq M1 \geqq 1.05$, $M2 \geqq 2.00$), more preferably $0.05 \leqq M1/M2 \leqq 0.35$, where M1 and M2 are the expansion ratios of the partially foamed product and the final product, respectively.

The above values M1 and M2 are defined as follows:

It is assumed that D0 represents the density of a resin composition containing a thermoplastic resin, a foaming agent, a cross-linking agent and, when required, other additives, i.e., the density of an unfoamed resin composition. A square piece of 10 cm by 10 cm is cut out of the final foamed product, the thickness thereof is measured using a dial gauge or the like, and the volume V2 of the cut piece is calculated from the measured thickness. Further, the weight W2 of the final foamed product, of which the volume has been calculated, is measured, and based on the obtained values, the density D2 of the final foamed product is calculated according to the following equation:

Density of final foamed product $D2 = W2/V2$

Then, the expansion ratio M2 of the final foamed product is calculated according to the following equation:

Expansion ratio of final foamed product
$M2 = D0/D2$

Namely, the expansion ratio M2 of the final foamed product mentioned in this specification represents the value obtained by dividing the density of the unfoamed resin composition by the density of the final foamed product.

Further, a square piece of 10 cm by 10 cm is cut out of the partially foamed product, the thickness thereof is measured using a dial gauge or the like, and the volume V1 of the cut piece is calculated from the measured thickness. Further, the weight W1 of the partially foamed product, of which the volume has been calculated, is measured, and based on the obtained values, the density D1 of the partially foamed product is calculated according to the following equation:

Density of partially foamed product $D1 = W1/V1$

Then, the expansion ratio M1 of the partially foamed product is calculated according to the following equation:

Expansion ratio of partially foamed product
$M1 = D0/D1$

Namely, the expansion ratio M1 of the partially foamed product mentioned in this specification represents the value obtained by dividing the density of the unfoamed resin composition by the density of the partially foamed product.

As is clear from the above, the expansion ratio mentioned in this specification is the ratio of the density of an unfoamed resin composition to the density of a partially foamed product or final foamed product of which the expansion ratio is to be derived.

The resin composition is extruded into the die so that the internal pressure of the die in the heating region ranges from 10 to 70 kgf/cm$^2$.

According to another aspect of the present invention, there is provided the following manufacturing apparatus for a cross-linked thermoplastic resin foam. In this apparatus, an extruder extrudes a resin composition containing at least a thermoplastic resin, a foaming agent, and a cross-linking agent. A closed die, which is directly jointed with an outlet of the extruder, includes at least a molding region, a heating region, and a cooling region. In the molding region, the resin composition fed from the extruder is molded into a desired shape. In the heating region, the resin composition molded into the desired shape is heated to decompose the cross-linking agent and also to decompose at least part of the foaming agent so that cell nuclei are produced, thereby forming a partially foamed product. In the cooling region, the partially foamed product is cooled to a temperature lower than the softening point thereof, and a damping force is applied to the partially foamed product when the cooled partially foamed product moves in the cooling region. Heat foaming means is used to heat the partially foamed product, extruded from the die, under the atmospheric pressure to expand the foaming agent fully, thereby obtaining a final product.

The cooling region of the die includes a sectional area portion narrower than the inlet sectional area thereof, on the outlet side of the position where the partially foamed product is cooled to the temperature lower than the softening point thereof.

Preferably, the cooling region of the die has a profile such that the sectional area of the partially foamed product moving through the cooling region gradually decreases.

More preferably, the cooling region of the die is formed so that there is a relation $0.50 \leqq S2/S1 \leqq 0.90$, where S1 and S2 are the inlet sectional area of the cooling region and the sectional area of the cooling region at the position where the partially foamed product is cooled to the temperature lower than the softening point thereof, respectively.

Further preferably, sectional area varying means capable of varying the sectional area of the partially foamed product is located at the desired position of the cooling region where the partially foamed product is cooled to the temperature lower than the softening point thereof, whereby the damping force is applied to the partially foamed product.

According to the method of the present invention, the inside of the die is divided successively into the three regions, the molding region, heating region, and cooling region, and the damping force is applied to the partially foamed product by means of the sectional area varying means, such as a choke bar or throttle means connected to the cooling region, thereby increasing the internal pressure of the die. Fine cell nuclei are produced in the heating region by doing this, and are kept in a frozen state. The expansion ratio of the partially foamed product is controlled in association with that of the cross-linked thermoplastic resin foam to be obtained, so that the cells of the resulting foam can be made fine and uniformly distributed. Thus, cross-linked thermoplastic resin foams having a smooth surface and fine cells with uniform diameters can be continuously manufactured with stability, providing a very high industrial utility value.

According to the present invention, the partially foamed product is once cooled and then continuously extruded from the die, unlike the method disclosed in U.S. Pat. No. 4,522,708 in which a final foamed product is obtained at the outlet of the die. The elongated partially foamed product thus extruded is rolled up and transported in the form of roll so that the partially foamed product may be expanded in a normal environment, i.e., under the atmospheric pressure, to obtain a final foamed product on the spot where it is to be used. A foamed product can be easily obtained by reheating the partially foamed product, and there is no particular restriction on the reheating means. Since the partially foamed product which has a volume twice that of the resin composition is transported, the transportation cost can be remarkably cut down.

According to the present invention, the partially foamed product is once cooled and then continuously extruded from the die, unlike the method disclosed in U.S. Pat. No. 4,522,798 in which a final foamed product is obtained at the outlet of the die, and therefore, the surface of the extruded partially foamed product may be covered with a film so that a foam having a smooth surface may thereafter be obtained by reheating the partially foamed product for expansion.

DETAILED DESCRIPTION

The present invention is based on information obtained from experiments conducted by the inventors hereof.

First, 100 parts by weight of low-density polyethylene, 10 parts by weight of azodicarbonamide (foaming agent: decomposition temperature at 190° C.), and 0.8 parts by weight of dicumyl peroxide (cross-linking agent) were uniformly kneaded to prepare a resin composition. Then, the composition was formed into sheets of 2-mm thickness at a temperature of 130° C. by means of a pressing machine. The resulting sheets were heated at 190° C. under various pressures for 8 minutes to decompose part of azodicarbonamide, and were then cooled to a temperature not higher than their softening point, whereupon the pressure was removed.

The respective profiles of the resulting sheets were observed by means of an electron microscope. Thereupon, it was indicated that very fine cell nuclei were uniformly distributed, although the size of the cell nuclei varied depending on the set pressures for the heating at 190° C. The diameters of the cell nuclei were measured.

Subsequently, the sheets were introduced into a constant-temperature bath under the atmospheric pressure, and were reheated at 220° C. for 10 minutes to form cross-linked thermoplastic resin foams. The respective profiles of these individual cross-linked thermoplastic resin foams were also observed by means of the electron microscope, and the diameters of cells were measured.

Figure 1:
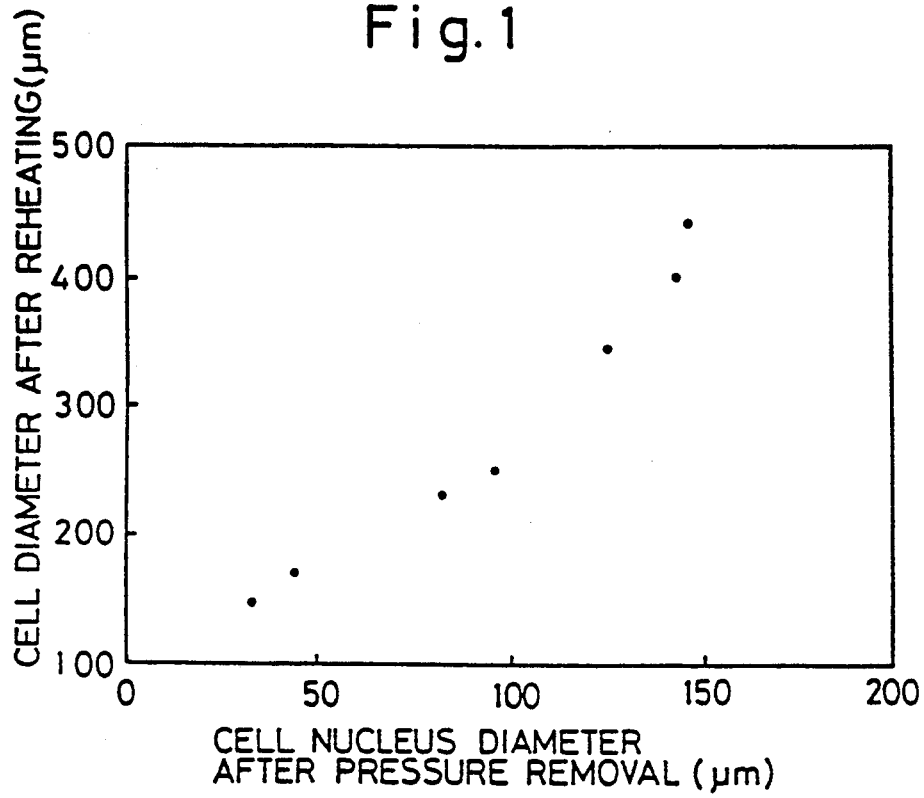
FIG. 1 is a graph showing the relationships between the diameters of cell nuclei in a partially foamed product obtained after pressure removal and the diameters of cells in a cross-linked thermoplastic resin foam after reheating.
Figure 2:
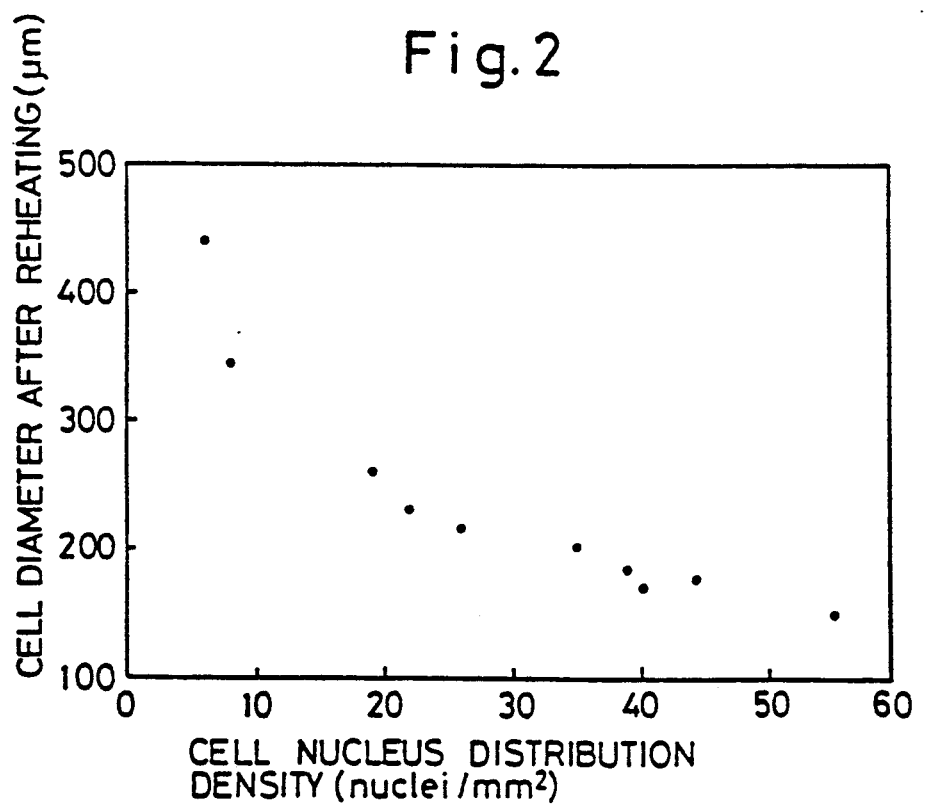
FIG. 2 is a graph showing the relationships between the distribution density of cell nuclei and the cell diameters obtained after reheating.
Figure 3:
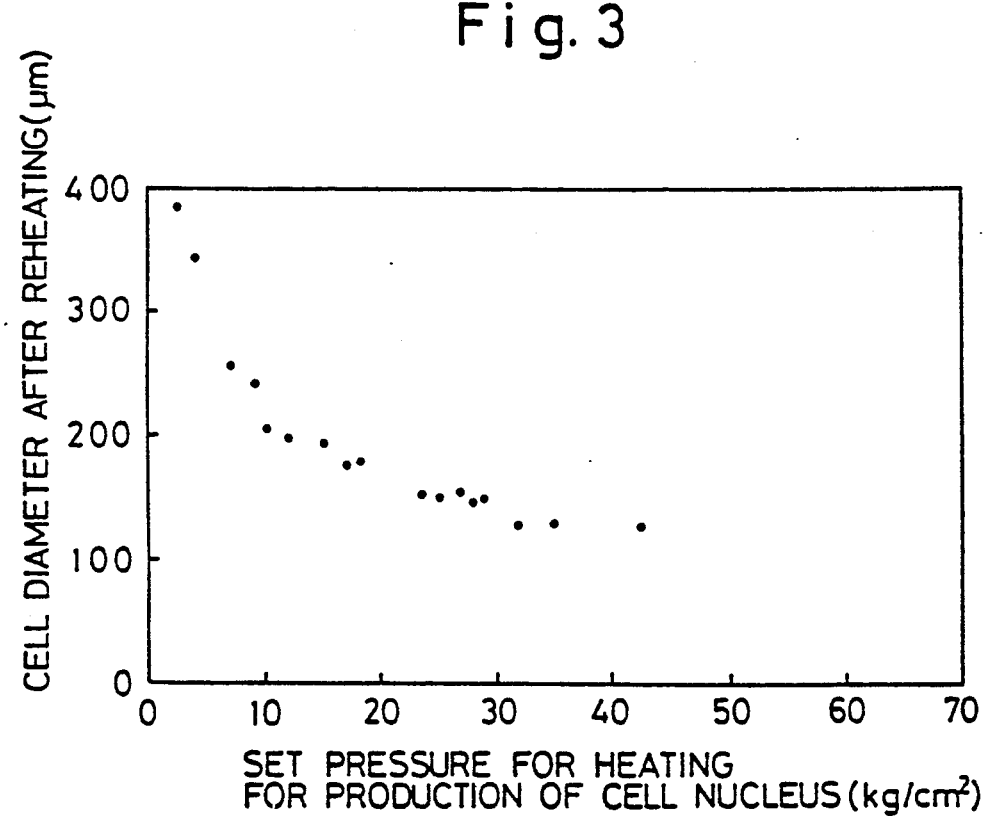
FIG. 3 is a graph showing the relationships between set pressures used at the time of heating for the production of cell nuclei and the cell diameters obtained after reheating.

FIG. 1 shows the relationships between the diameters of the cell nuclei in the sheets obtained after the pressure removal and the cell diameters obtained after reheating. FIG. 2 shows the relationships between the distribution density of the cell nuclei and the cell diameters obtained after reheating. FIG. 3 shows the relationships between set pressures for the production of the cell nuclei and the cell diameters obtained after reheating.

The cell diameter, the diameter of cell nuclei, and the distribution density of cell nuclei were measured in the following manner.

For the cell diameter of a cross-linked foam, a section of the cross-linked foam was photographed using an electron microscope, a straight line of 25 mm by actual measurement was drawn on the obtained photograph, the number N of cells present on the straight line was counted, and the cell diameter was calculated according to the following equation:

$$\text{Cell diameter } (\mu m) = 2500/N$$

As for the diameter of cell nuclei formed in a partially foamed product, i.e., the cell nucleus diameter, a section of the partially foamed product was photographed using an electron microscope, 10 cell nuclei in the obtained photograph were selected at random, the diameters of the selected 10 cell nuclei were measured, and an average of the measured values was used as the cell nucleus diameter.

The distribution density of cell nuclei formed in a partially foamed product, i.e., the cell nuclei distribution density, was measured as follows: A section of the partially foamed product was photographed using an electron microscope, the number of cell nuclei present in a square of 1 mm×1 mm by actual measurement on the obtained photograph was counted for 10 different regions in the photograph, and an average of the measured values was used as the cell nuclei distribution density (nuclei/mm$^2$).

As seen from FIGS. 1 to 3, the cells in the cross-linked thermoplastic resin foams are fine if the pressure applied for partial foaming is high, and a pressure of 10 kg/cm$^2$ or more must be applied to the sheets in order to form cells of 200 μm or less (FIG. 3). Further, there is a substantially linear relationship between the respective diameters of the cell nuclei and the cells in the cross-linked thermoplastic resin foams (FIG. 1), and those cross-linked thermoplastic resin foams whose cell nucleus distribution density is higher can contain finer cells (FIG. 2).

Thus, in order to manufacture cross-linked thermoplastic resin foams with fine uniform cells, it is essential to form fine cell nuclei at high distribution density by partial foaming of the resin composition under pressure at the same time with cross-linking. After this is done, the previously cross-linked resin restrains the cells from being coarsened by the communication between the adjacent cell nuclei, despite the heating under the atmospheric pressure. As a result, cross-linked thermoplastic resin foams with uniformly distributed fine cells can be obtained.

A method according to the present invention will now be described in detail with reference to the accompanying drawings.

Figure 4:
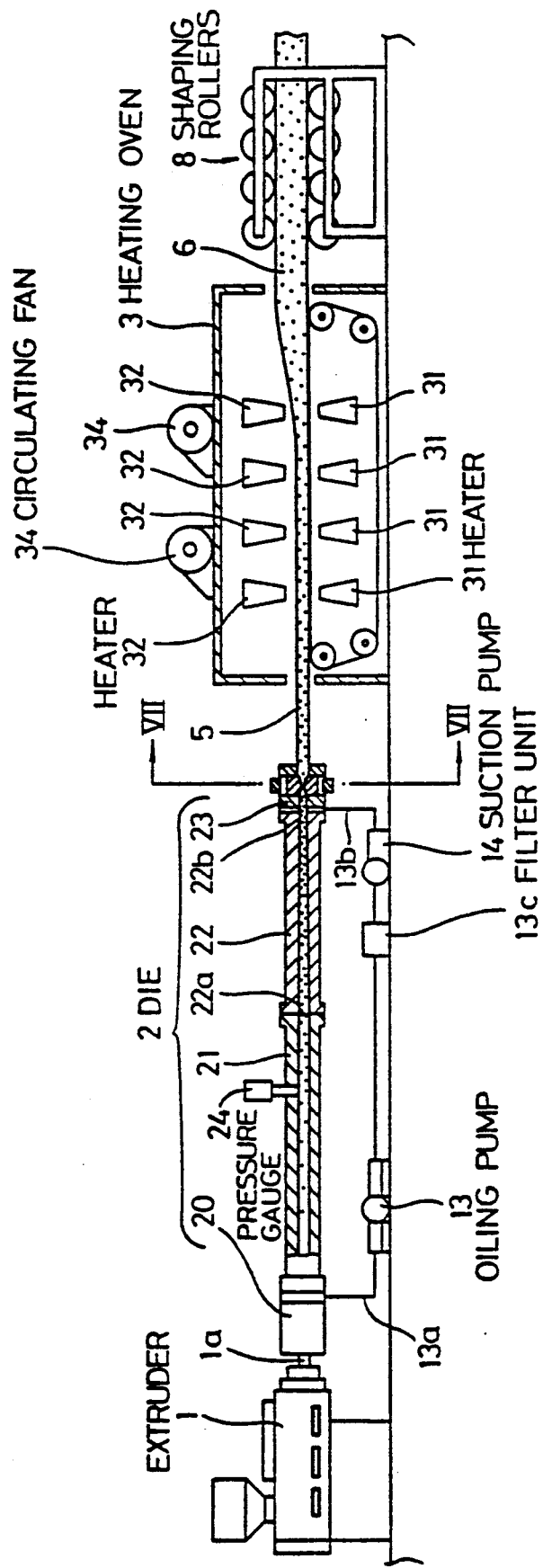
FIG. 4 is a schematic side view showing an example of an apparatus used in a method according to the present invention.

FIG. 4 is a schematic view showing an example of an apparatus used for effecting the method according to the present invention.

In FIG. 4, the apparatus generally comprises an extruder 1 for the resin composition, a die 2 connected to an outlet 1a of the extruder 1, and a heating oven 3 located on the lower-course side of the die 2, these components being arranged in series.

The die 2 includes a molding region 20, a heating region 21, and a cooling region 22 continuously arranged in the order named from the upper-course side (side of the outlet 1a of the extruder). Disposed at the outlet of the cooling region 22 is sectional area varying means 23 which can vary the sectional area of a partially foamed product (mentioned later) pushed out through the outlet.

The cross-linked thermoplastic resin foam to be manufactured moves in the apparatus in the following manner as a whole.

The resin composition extruded from the extruder 1 is molded into a desired shape in the molding region 20, converted into a partially foamed product 5 in the heating region 21, cooled to a temperature lower than its softening point in the cooling region 22, and then extruded from the die 2 via the sectional area varying means 23. Subsequently, the partially foamed product is introduced directly into the heating oven 3 under normal pressure, whereupon it is heated to a predetermined temperature to be formed into a cross-linked thermoplastic resin foam 6 as final product.

At this time, the extruder 1 and the die 2, formed of the forming, heating, and cooling regions 20, 21 and 22, are closely in contact with each other, and are full of the resin composition (and its partially foamed product). If the extruder 1 or the die 2 is not filled with the resin composition, the internal pressure of the die 2 can be neither increased nor maintained even if a damping force is applied to the partially foamed product mentioned later.

In this general flow of processes, a thermoplastic resin, a foaming agent, and a cross-linking agent, as essential ingredients, are uniformly mixed in the extruder 1 to prepare a resin composition of a predetermined make-up. This uniform mixing is effected using a temperature at which neither of the foaming agent and the cross-linking agent can be decomposed.

The thermoplastic resin used may be, for example, polyethylene; polypropylene; ethylene copolymer, such as ethylene-propylene copolymer, ethylene-vinyl acetate copolymer, or ethylene-ethyl acrylate copolymer; polyvinyl chloride; or a mixture of these materials. Also, this thermoplastic resin may be blended with a suitable amount of additives, such as a conventional pigment, antioxidant, ultraviolet absorber, fire retardant, antistatic agent, anti-fungus agent, inorganic filler, etc.

The foaming agent used may be selected from any ones of a decomposition type which can be pyrolytically decomposed to produce gas, such as nitrogen gas, carbon dioxide gas, etc., during the process of heating in the die 2 mentioned later. These materials include, for example, azodicarbonamide, dinitrosopentamethylenetetramine, 4,4'-oxybis(benzene sulfonyl hydrazide), azobisisobutyronitrile, etc.

The contents of these foaming agents are suitably selected depending on the expansion ratio of the foam to be obtained. Usually, they range from 5 to 30 parts by weight compared with 100 parts by weight for the aforesaid thermoplastic resin, preferably from 7 to 20 parts by weight. If necessary, a suitable amount of various assistants or nucleators may be added to these foaming agents.

The cross-linking agent, for use as a third essential ingredient of the resin composition, may be selected from ones whose decomposition temperature is not lower than the melting start temperature of the thermoplastic resin. These materials include, for example, dicumyl peroxide, di-t-butyl peroxide, t-butyl cumyl peroxide, 2,5-dimethyl-2,5-di(t-butyl peroxy) hexane, 2,5-dimethyl-2,5-di(t-butyl peroxy) hexyne-3, etc.

The contents of these cross-linking agents are suitably selected depending on the degree of cross-linking of the cross-linked thermoplastic resin foam, as a final product to be obtained, and the molecular structure of the thermoplastic resin. Usually, they range from 0.2 to 5.0 parts by weight compared with 100 parts by weight for the thermoplastic resin, preferably from 0.3 to 3.0 parts by weight, and more preferably from 0.3 to 1.0 part by weight.

The resin composition obtained by uniformly mixing these ingredients is continuously extruded from the extruder 1 to the die 2 through the outlet 1a. The resin composition extruded out through the outlet 1a of the extruder 1 is first molded into a predetermined shape in the molding region 20. In doing this, a molded product of any desired shape, such as a sheet-, plate-, or rod-shaped product, can be obtained by suitably selecting the die shape in the molding region 20.

After passing the molding region 20, the molded product is transferred to the heating region 21. While moving through the heating region 21, the molded product is heated to a predetermined temperature by heating means (not shown), such as molded-in heaters or planar heating elements provided on the upper and lower surfaces of the die. As a result, the cross-linking agent contained in the molded product is pyrolytically decomposed, so that the cross-linking of the thermoplastic resin advances. At the same time, the foaming agent in the molded product is partially decomposed to form fine cell nuclei uniformly distributed in the product, whereupon the molded product is converted into the partially foamed product 5.

Preferably, the cross-linking of the partially foamed product 5, obtained in this manner, is at a degree such that the residual gel weight fraction obtained when the product 5 is subjected to 24 hours of extraction in a xylene solution of 120° C. is 5% or more. If the cross-linking degree is such that the residual gel weight fraction is less than 5%, the cells in the finally obtained cross-linked thermoplastic resin foam 6 is liable to become coarse.

In the initial stage of this decomposition process, the foaming agent in the molded product is partially decomposed. The decomposition of the foaming agent, that is, partial foaming of the molded product, is effected so that there is a relation $M1/M2 \leq 0.525$ ($5.00 \geq M1 \geq 1.05$, $M2 \geq 2.00$), where M1 and M2 are the expansion ratio of the partially foamed product 5 extruded from the die 2 and the expansion ratio of the cross-linked thermoplastic resin foam 6 to be finally obtained, respectively, the values M1 and M2 being calculated by the aforementioned method. In this case, the foaming agent should only be decomposed so that the aforesaid requirement is fulfilled. The amount of decomposition of the foaming agent preferably ranges from 20 to 95% of the foaming agent content of the resin composition, more preferably from 30 to 90%, and further preferably from 50 to 90%.

If the value of M1 is smaller than 1.05 for the expansion ratio ($M1 < 1.05$), sufficient cell nuclei cannot be formed in the partially foamed product 5, the cells in the cross-linked thermoplastic resin foam 6 cannot be fine, and their distribution is uneven.

If $M1 > 5.00$, the partially foamed product 5 undergoes a large natural expansion when extruded from the die 2, which leads to production of cracks in the surface, and stable extrusion cannot be achieved, making the continuous manufacturing difficult.

If the partially foamed product 5 is subject to a relation $M1/M2 > 0.525$, the partially formed product 5 undergoes a substantial natural expansion, which is liable to cause cracks or the like in the surface, when the product 5 is extruded from the die 2.

Preferably, the relationship between M1 and M2 is given by $0.05 \leq M1/M2 \leq 0.35$, more preferably $0.05 \leq M1/M2 \leq 0.2$.

When manufacturing a partially foamed product by partially decomposing the foaming agent, the partially foamed product preferably fulfills the conditions of not greater than 100 μm of cell nucleus diameter and not smaller than 20 nuclei/mm² of cell nuclei distribution density, more preferably, the conditions of not greater than 80 μm of cell nucleus diameter and not smaller than 30 nuclei/mm² of cell nuclei distribution density, still preferably, the conditions of not greater than 50 μm of cell nucleus diameter and not smaller than 50 nuclei/mm² of cell nuclei distribution density.

If neither of the two conditions are satisfied, it is difficult to obtain a final foamed product having a uniform distribution of fine cells.

The expansion ratio M1 of the partially foamed product 5 is controlled by suitably selecting the respective temperatures of the heating and cooling regions 21 and 22.

After passing the heating region 21, the partially foamed product 5 is transferred to the cooling region 22 in the next stage, whereupon it is cooled to a temperature lower than its softening point and given a damping force.

If the partially foamed product 5 is only insufficiently cooled in the cooling region 22 so that the product 5 is at a temperature not lower than its softening point when it is extruded from the die 2, the product 5, which is softened, is naturally expanded by the pressure of the gas therein. As a result, destruction of the resulting fine cell nuclei advances, and the surface of the product 5 cracks.

If the partially foamed product 5 in the cooling region 22, moving in the extruding direction, is subjected to a damping force to resist its movement, a spontaneous pressure attributable to the decomposition of the foaming agent in the resin composition can be confined to maintain the internal pressure of the die 2. The sectional area varying means is, unlike the one described in Published Unexamined Japanese Patent Application No. 2-283421, arranged in the cooling region at a location where the whole of the partially foamed product, including the central part thereof, is cooled to a temperature lower than the softening point thereof. In Published Unexamined Japanese Patent Application No. 2-283421, the throttle die is arranged in the heating region or at a location where the resin composition is in a molten state and thus the partially foamed product is still at high temperature and soft. Thus, when the passage is narrowed by the choke bar, the flow of the partially foamed product is disturbed or stagnation occurs at the choke bar, and therefore, the partially foamed product extruded from the die may be bent or its surface may be cracked, thus causing a difficulty in the manufacture of foams. This is the case with the prior art disclosed in Published Unexamined Japanese Patent Applications No. 57-167225, No. 59-1232, No. 60-110424, No. 60-112418, No. 61-127324, No. 62-211122, No. 63-251437, and No. 63-254142. These publications disclose arranging the throttle die at the heating region or at a location where the resin composition is in a molten state and thus the partially foamed product is still at high temperature and soft. Thus, when the passage is narrowed by the choke bar, the flow of the partially foamed product is disturbed or stagnation occurs at the choke bar, and therefore, the foamed product finally extruded from the die may be bent or its surface may be cracked, thus making uniform and stable manufacture of foams difficult.

In the method of the present invention, by contrast, the sectional area varying means is arranged in the cooling region at a location where the whole of the partially foamed product, including the central part thereof, is cooled to a temperature lower than the softening point thereof. The damping force exerted by the sectional area varying means is applied to the partially foamed product when the product is entirely cooled in the cooling region to a temperature lower than the softening point, that is, when its rigidity is increased. Having the increased rigidity, the partially foamed product constitutes, so to speak, an obstacle to the escape of the pressure produced by the decomposition of the foaming agent in the heating region 21, from the die 2 through its outlet into the atmosphere, so that a closed system is formed ranging from the extruder to the outlet portion of the die 2. Accordingly, the pressure is confined to the die, that is, the internal pressure of the die 2 can be kept at a desired value. Thus, the internal pressure of the die 2 can be efficiently increased without disturbing the flow of resin composition in the heating region 21, or bending or cracking the partially foamed product 5 extruded from the die 2. In this manner, the fine cell nuclei in the product 5 can be uniformly generated and maintained, and the product 5 can be extruded with stability.

In order to distribute fine cells of 200 μm or less uniformly in the cross-linked foam 6 to be obtained, the internal pressure of the die 2 is preferably controlled so as to range from 10 to 70 kg/cm². This internal pressure is suitably selected in consideration of the target cell diameter. If the internal pressure of the die 2 is lower than 10 kg/cm$^2$, the cell diameters of the resulting cross-linked thermoplastic resin foam 6 are greater than 200 μm, and their distribution is uneven, as shown in FIG. 3. If the internal pressure is higher than 70 kg/cm$^2$, on the other hand, its effect reaches the limit, and the apparatus must have a pressure-resistant structure as a whole.

In the present invention, pressure of the aforesaid range is applied for the following reason.

Part of the cross-linking agent and foaming agent, previously mixed in the resin, is heated under pressure, whereby the resin is cross-linked and substantially at the same time, the foaming agent is decomposed to form cell nuclei. However, since the foaming agent is decomposed under pressure, the produced nuclei are restrained from growing excessively by the function of the applied pressure. Then, the resin composition is cooled to increase the rigidity of the resin and the produced cell nuclei are fixed. At this time, the resin composition is converted into partially foamed product. In the cooling step, the partially foamed product must be cooled such that the entire structure, including the central part thereof, is cooled to a temperature lower than the softening point thereof.

When the partially foamed product is thereafter heated under the atmospheric pressure, excessive growth of cells due to the unifying (communication) of adjoining cell nuclei is restricted by an increased melting viscosity provided by the cross-linked resin, whereby individual cell nuclei grow independently without being unified with others. Consequently, a cross-linked foam having uniformly distributed fine cells can be obtained.

The foam obtained in this manner by reheating the partially foamed product having high-density fine cells under the atmospheric pressure has a smaller cell diameter than conventional chemically cross-linked foams which are expanded merely under the atmospheric pressure.

In U.S. Pat. No. 4,522,708, the purpose of applying pressure is as follows. When part of the foaming agent evaporates or decomposes, gas cells are formed, which deteriorates internal conduction of heat and hinders uniform cross-linking, and therefore, gas produced by the decomposition of part of the foaming agent is dissolved in the incompletely cross-linked resin by applying pressure. The pressure value set forth in the U.S. patent is measured by a pressure gauge mounted to an outlet of the extruder, and ranges from 20 to 72 kg/cm$^2$ according to the disclosed examples.

By contrast, the present invention is based on the knowledge that the pressure applied at the time of initial decomposition of the foaming agent contained in the resin composition for the formation cell nuclei bears great significance. The pressure values at the outlet of the extruder, disclosed in U.S. Pat. No. 4,522,708 with reference to the examples, provide no technical suggestion because, in the present invention, no decomposition of the foaming agent takes place at the outlet of the extruder.

According to the present invention, fine cell nuclei are produced at high density by the initial decomposition of the foaming agent, and the thus-produced cell nuclei are positively utilized to form fine cells in the final foamed product. The present invention is free from the problems mentioned in U.S. Pat. No. 4,522,708, i.e., deterioration in internal heat conduction due to cells produced by the evaporation or decomposition of part of the foaming agent, and hindrance to uniform cross-linking. In the present invention, high-density fine cell nuclei ensure good heat conduction when heat is generated by the decomposition of the foaming agent, and the problem mentioned in U.S. Pat. No. 4,522,708 that poor internal heat conduction caused by cells hinders uniform cross-linking does not occur.

The internal pressure of the die 2 is measured by means of a pressure gauge 24 mounted in the heating region 21, for example, as shown in FIG. 4.

Thus, the pressure of the gas produced due to the decomposition of the foaming agent in the heating region 21 is confined to maintain the internal pressure of the die 2 by applying the damping force to the partially foamed product 5. To attain this, according to the present invention, it is advisable to design the cooling region 22 itself in the following manner.

First, the internal profile of the cooling region 22 is preferably designed so that the sectional area of the region 22, through which the partially foamed product 5 moves, gradually decreases from an inlet 22a, serving as a junction to the heating region 21, toward an outlet 22b of the region 22.

In this case, moreover, the internal profile of the cooling region 22 is preferably designed so that there is a relation $0.50 \leq S2/S1 \leq 0.90$, where S1 and S2 are the sectional area of the cooling region 22 on the side of the inlet 22a and the outlet-side sectional area of the region 22 at the position where the partially foamed product 5 is fully cooled to a temperature lower than its softening point, respectively. Generally, it is advisable to use the portion corresponding to the sectional area S2 as the outlet 22b of the cooling region 22.

If there is a relation $S2/S1 > 0.90$, the damping force applied to the partially foamed product is too small to increase the internal pressure of the die 2, so that the effects of stably freezing and maintaining the fine cell nuclei generated in the heating region 21 are dampened. If there is a relation $S2/S1 < 0.5$, on the other hand, the damping force applied is so great that the internal pressure of the die 2 sometimes increases suddenly. As a result, it is difficult to adjust the internal pressure of the die 2, and at the same time, the apparatus must have a large-scale pressure-resistant structure, as a whole, to cope with production of excessive pressure.

Preferably, there should be a relation $0.70 \leq S2/S1 \leq 0.90$, more preferably $0.65 \leq S2/S1 \leq 0.80$.

Figure 5A:
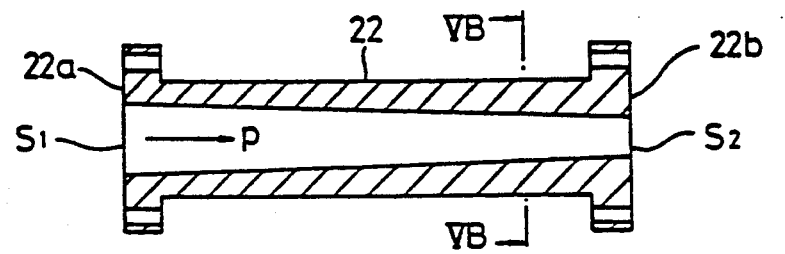
FIG. 5A is a view showing an example of a cooling region.
Figure 5B:
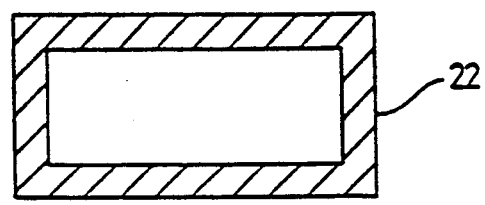
FIG. 5B is a cross-sectional view taken along line VB—VB of FIG. 5A.

If the cross-linked thermoplastic resin foam 6 to be obtained is a plate member, it is to be desired that the cooling region 22 should have the internal profile shown in FIGS. 5A and 5B. More specifically, the passage profile of the partially foamed product is rectangular, and the sectional area of the rectangular profile is gradually reduced from the inlet 22a connected to the heating region 21 toward the outlet 22b. In other words, the cooling region 22 is narrowed toward the outlet side in the advancing direction of the partially foamed product indicated by arrow p in FIG. 5A. In this arrangement, the damping force also acts on the partially foamed product in the heating region 21 and the molding region 20, so that the spontaneous pressure attributable to the decomposition of the foaming agent in the resin composition can be confined to keep the internal pressure of the die 2 at a desired value.

Figure 6:
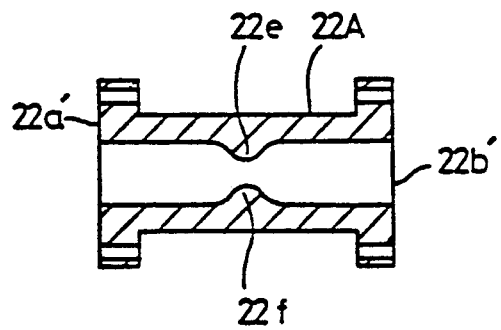
FIG. 6 is a side sectional view showing another example of the cooling region.

The internal profile of the cooling region 22 is not limited to the gradually narrowed shape. As shown in FIG. 6, for example, opposite projections 22e and 22f may be formed individually on the upper and lower portions of the inner wall of the cooling region 22 which constitutes part of a passage for the partially foamed product. In this case, the relation between the sectional area S2 defined by the projections 22e and 22f and the area S1 of a junction surface 22a' is set as aforesaid.

Preferably, the inner wall portions corresponding to the projections 22e and 22f should be located at positions where the partially foamed product flowing inside is cooled to a temperature lower than its softening point.

The internal profile of the cooling region 22 may be designed so that only its height gradually decreases toward the outlet side without a change of its width, or only the width gradually decreases toward the outlet without a change of the height.

The application of the damping force to the partially foamed product and the maintenance of the internal pressure of the die 2, which utilizes the spontaneous pressure attributable to the decomposition of the foaming agent in the resin composition, can be more efficiently achieved by using the sectional area varying means 23 additionally provided at the outlet 22b of the cooling region 22.

The sectional area varying means 23 may be formed of, for example, a choke bar, which will be mentioned later.

Figure 7:
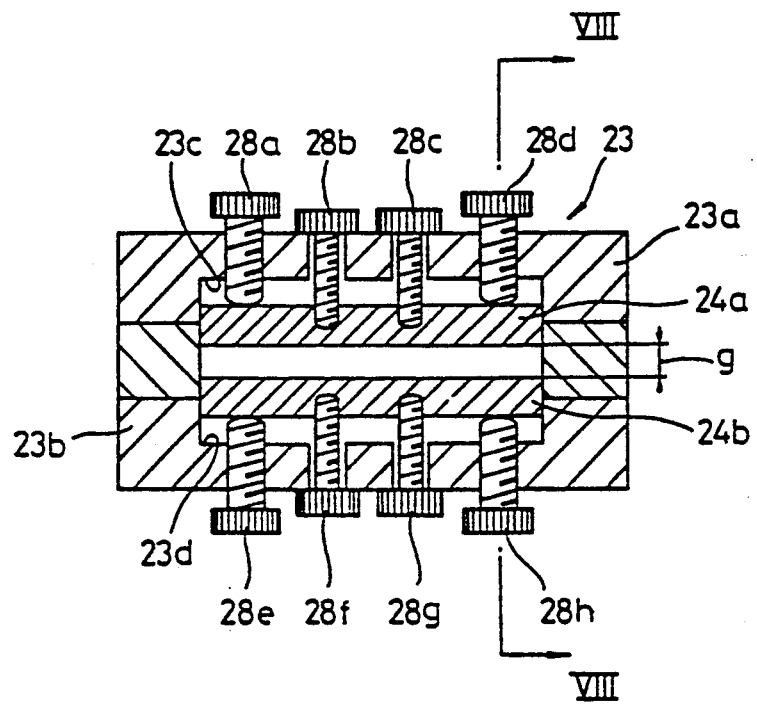
FIG. 7 is a sectional view of a choke bar taken along line VII—VII of FIG. 4.
Figure 8:
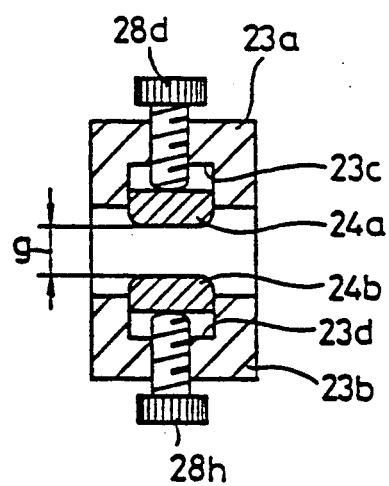
FIG. 8 is a sectional view taken along line VIII—VIII of FIG. 7.

FIG. 7 is a sectional view taken along line VII—VII of FIG. 4, and FIG. 8 is a sectional view taken along line VIII—VIII of FIG. 7. As shown in FIGS. 7 and 8, a choke bar fixing frame is attached to the outlet 22b of the cooling region 22. The fixing frame, which is rectangular as a whole, is composed of upper and lower frames 23a and 23b which have grooves 23c and 23d, respectively, extending transversely so as to face each other.

The proximal end portions of two choke bar bodies 24a and 24b are fitted in the grooves 23c and 23d of the fixing frame, respectively, so as to be mounted on the upper and lower frames 23a and 23b, respectively, by means of adjust screws 28a to 28h.

When the adjust screw 28a to 28h of the choke bar 23 are moved vertically, the choke bar bodies 24a and 24b connected to these screws also move vertically in the grooves 23c and 23d, respectively. Thus, a gap g between the bodies 24a and 24b can be freely adjusted by operating the adjust screws. By widening or narrowing the gap g depending on the extrusion state of the partially foamed product 5, therefore, the damping force to be applied to the product 5 can be adjusted to keep the internal pressure of the die 2 constant.

Preferably, as described above, the choke bar 23 should be provided at the cooling region 22 as part thereof, and may be suitably located in any position where the temperature of the partially foamed product 5 moving therein is lower than its softening point.

In the present invention, the partially foamed product is cooled for the following three reasons.

First, the cooling step is effected to prevent excessive growth of cell nuclei due to the unifying of fine cell nuclei formed in the partially foamed product, i.e., to retain fine cell nuclei.

Second, the cooling step is effected to maintain the internal pressure of the die, i.e., to sufficiently cool the whole of the partially foamed product, including the central part thereof, to a temperature lower than the softening point thereof to thereby increase the rigidity. The partially foamed product in such a state is then subjected to the action of the sectional area varying means such as the aforesaid choke bar. Since the partially foamed product is sufficiently cooled, inclusive of the central part thereof, to a temperature lower than the softening point thereof and the rigidity is increased, the sectional area varying means can fully attain its expected results, i.e., application and maintenance of pressure with respect to the partially foamed product. Further, such application and maintenance of pressure can be reliably achieved by the sectional area varying means without disturbing the flow of the partially foamed product in the die, because the partially foamed product is in its entirety, including the central part thereof, sufficiently cooled to a temperature lower than the softening point thereof and the rigidity is increased.

Third, the partially foamed product is cooled to a temperature lower than the softening point thereof in the cooling region downstream of the heating region so that the partially foamed product is restrained from being freely deformed, to thereby control the flow of the partially foamed product in the cooling region, and at the same time, make the flow of the resin composition in the upstream heating region uniform. As a result, the resin composition in the heating region can be uniformly heated.

To this end, it is essential to cool the whole of the partially foamed product, including the central part thereof, to a temperature lower than the softening point. The overall length of the cooling region is determined by the set temperature of the heating region, the heat conductivity of the partially foamed product, and the extruded quantity, and thus is changed suitably. Preferably, however, the overall length of the cooling region is not shorter than 300 mm, more preferably not shorter than 400 mm, and still preferably not shorter than 700 mm.

If the overall length of the cooling region is shorter than 300 mm, the following disadvantage can arise.

If the central part of the partially foamed product is not sufficiently cooled, a temperature difference along the thickness of the partially foamed product occurs and the unifying of cell nuclei produced in the partially foamed product cannot be prevented. As a result, the cell nucleus diameter and the cell nuclei distribution density become non-uniform, and thus the final foamed product obtained has non-uniform cell diameters. Further, if the central part of the partially foamed product is not sufficiently cooled, the rigidity of the partially foamed product is not sufficiently increased, and thus the foam cannot be efficiently applied with pressure by the sectional area varying means arranged at a later stage. Furthermore, if the central part of the partially foamed product is not sufficiently cooled, the partially foamed product undergoes a natural expansion due to the pressure of gases contained therein, and hence the produced fine cell nuclei may be destroyed or cracks may be formed in the surface, thus impeding stable extrusion and continuous manufacturing.

In the position where the temperature is lower than the softening point, the partially foamed product is increased in rigidity, as mentioned before, so that it can be kept in shape. Accordingly, the damping force can be effectively applied to the partially foamed product 5, so that the spontaneous pressure in the die 2, attributable to the decomposition of the foaming agent, can be efficiently retained.

Figure 9:
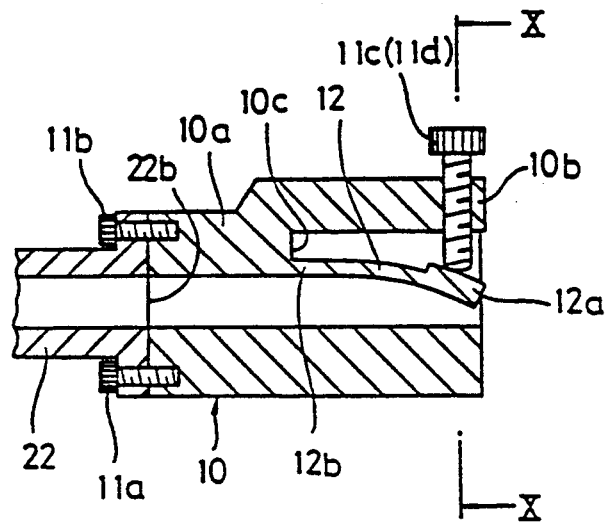
FIG. 9 is a side sectional view illustrating throttle means.
Figure 10:
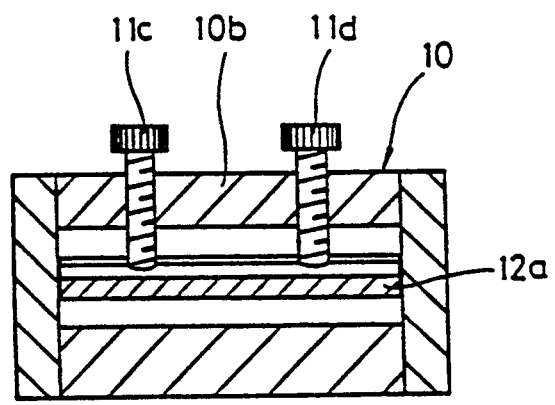
FIG. 10 is a sectional view taken along line X—X of FIG. 9.

In order to maintain the internal pressure of the die 2, throttle means 10 of the construction shown in FIG. 9 and the sectional view of FIG. 10 taken along line X—X of FIG. 9 may be provided at the outlet 22b of the cooling region 22, instead of using the choke bar 23 shown in FIGS. 7 and 8.

The throttle means 10, which has the same internal profile as the cooling region 22, is attached integrally to a flange portion of the region 22 by means of screws 11a and 11b.

An upper frame 10a of the throttle means 10 is formed having a stepped portion 10c which is raised toward an outlet end 10b. The stepped portion 10c is provided with a tongue 12 whose width is equal to that of the internal profile of the cooling region 22. A proximal end 12b of the tongue 12 is fixed to the stepped portion 10c so that a passage side face 12c of the tongue 12 is flush with the upper wall of the cooling region 22. The respective tip ends of screws 11c and 11d, which are screwed in the upper frame 10a near the outlet end 10b, abut against a distal end 12a of the tongue 12.

If the screws 11c and 11d of the throttle means 10 are adjusted so that the tongue 12 horizontally extends straight from its proximal end 12b, the partially foamed product 5 pushed out through the outlet of the cooling region 22 can be extruded without being damped by the throttle means 10. If the screws 11c and 11d are screwed in downward, however, the distal end 12a of the tongue 12 is pressed by the screws 11c and 11d, so that the tongue 12 bends downward with respect to the proximal end 12b. Accordingly, the internal profile of the throttle means 10 is continuously reduced in the vertical direction. Thus, the partially foamed product 5 pushed out through the outlet of the cooling region 22 is continuously contracted to be subjected to the damping force by the bent tongue 12.

In this manner, the contraction of the partially foamed product 5, that is, the damping force to be applied, can be freely adjusted by changing the depth of screwing of the screws 11c and 11d. Therefore, the damping force of a suitable magnitude can be applied corresponding to the extrusion state of the partially foamed product, so that the spontaneous pressure in the die 2, attributable to the decomposition of the foaming agent, can be suitably adjusted.

The throttle means 10 is superior to the choke bar 23 in that there is no difference in level or drastic change in sectional area in the vicinity of the junction to the outlet 22b of the cooling region 22.

Preferably, a lubricant is injected from an oiling pump 13 into the boundary between the molding region 20 and the heating region 21 through an oiling pipe 13a. By doing this, the lubricant is adhered to the outer peripheral surface of the molded product moving from the molding region 20 to the heating region 21. As the cross-linking of the partially foamed product 5 advances while the product moves through the heating region 21 and the cooling region 22, the melt viscosity of the partially foamed products 5 increases to increase the frictional resistance to the inner wall of the die 2 in the regions 21 and 22, and accordingly, the product 5 may cease to move downstream. The lubricant serves to prevent an increase of the head load of the extruder 1 and thus damage to the extruder.

Thus, by adhering the lubricant to the outer peripheral surface of the molded product from the molding region 20, the frictional resistance between the inner wall of the die 2 in the heating region 21 and the cooling region 22 and the partially foamed product 5 can be reduced to ensure a smooth downstream movement of the product.

The lubricant used for this purpose must be one which cannot be decomposed or evaporated by heat from the heating region 21, and is reluctant to melt into or deteriorate the molded product and chemically stable. For example, liquid polysiloxane, polyhydric alcohol such as ethylene glycol, alkyl ester, alkyl ether, or polyoxyalkylene may be used as the lubricant.

The lubricant injected into the molding region 20 reaches the outlet of the cooling region 22 without leaving the outer peripheral surface of the partially foamed product 5, whereupon it is scraped off by means of the choke bar bodies 24a and 24b or the tongue 12 of the throttle means 10. The lubricant removed from the surface of the partially foamed product is eliminated by suction using a suction pump 14, through a pipe 13b connected to the choke bar or the throttle means. Thereafter, the lubricant is filtered by means of a filter unit 13c, and is then injected again into the molding region 20 by means of the oiling pump 13.

If the lubricant is not removed in this manner, it remains on the partially foamed product 5 as it is introduced into the heating oven 3, thereby considerably damaging the external appearance of the resulting cross-linked thermoplastic resin foam 6.

The partially foamed product 5, thus extruded through the choke bar or the throttle means, is introduced into the heating oven 3 under normal pressure to be heated therein, so that uniform foaming around the frozen cell nuclei advances, whereupon the cross-linked thermoplastic resin foam 6 with uniform fine cells is obtained.

In the heating oven 3, which has a conventional structure, the partially foamed product 5 is transported by means of a belt conveyor 30 to be vertically reheated by means of heaters 31 and 32 on either side. The heaters 31 and 32 may be selected from ones of various types, such as infrared heaters, far-infrared heaters, hot-air heaters, etc. In FIG. 4, numeral 34 denotes circulating fans for circulating hot air in the oven.

The cross-linked thermoplastic resin foam 6 fully expanded in the heating oven 3 is shaped by means of shaping rollers 8 in the next stage, and is taken off by means of a take-off unit (not shown).

EXAMPLE 1

A cross-linked thermoplastic resin foam was manufactured by using the manufacturing apparatus shown in FIG. 4. First, 100 parts by weight of low-density polyethylene (MI: 0.8 g/10 min; density: 0.920 g/cm$^3$), 10 parts by weight of azodicarbonamide, and 1.0 part by weight of dicumyl peroxide were introduced into the extruder 1 (single-screwed; inside diameter: 75 mm; L/D=28), and melted and mixed at 130° C., and the resulting resin composition was extruded into the die 2. The density D0 of the resin composition was 0.958 g/cm$^3$.

The molding region 20 of the die 2 is fitted with a coat hanger die, which can mold the resin composition from the extruder 1 into a flat plate of 150 mm width and 10 mm thickness, and its temperature is set at 130° C. The heating region 21, which has an overall length of 900 mm and a square straight profile 150 mm wide and 10 mm high, is adjusted to three stages of temperature, 150° C., 180° C., and 195° C., arranged downstream. A fixed amount of diethylene glycol, for use as the lubricant, was injected at the boundary between the outlet 1a of the extruder 1 and the molding region 20 by means of the oiling pump 13. The cooling region 22, which has an overall length of 700 mm, is of a tapered type, as shown in FIG. 5, having its internal profile gradually similarly reduced so that the internal sectional area ratio S2/S1 is 0.8. In the region 22, the partially foamed product was cooled such that the surface and central part thereof were 45° C. and 50° C., respectively. The choke bar 23, as shown in FIGS. 7 and 8, was attached to the outlet 22b of the cooling region 22, and the gap between the choke bar bodies 24a and 24b were adjusted so that the ratio of the sectional area between the choke bar bodies 24a and 24b to the inlet sectional area of the region 22 was 0.65. At this time, the indication of the pressure in the die 2 measured by means of the pressure gauge 24 in the heating region 21 was 35 kg/cm$^2$.

Figure 11:
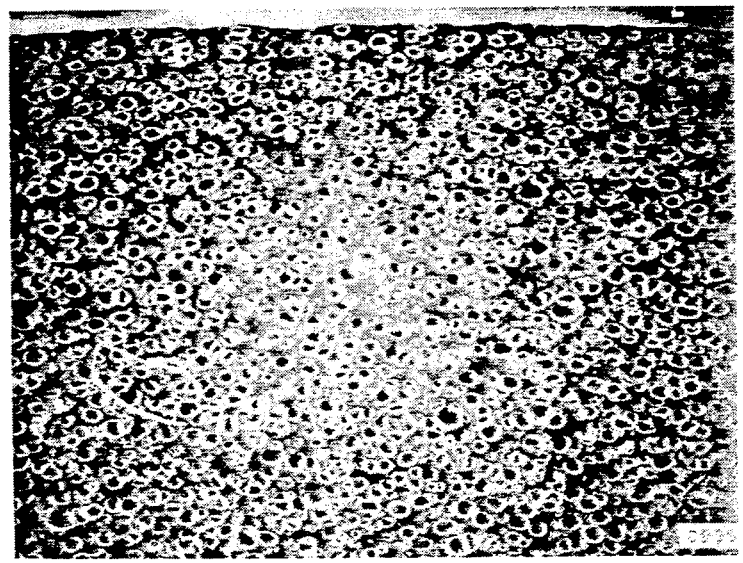
FIG. 11 shows a microphotograph of a sectional texture of the partially foamed product.

The partially foamed product 5 extruded from the choke bar 23 exhibited a residual gel weight fraction of 57%, bulk density of 0.455 g/cm$^3$, and expansion ratio M1 of 2.0. FIG. 11 shows a microphotograph of the sectional texture of the product 5. In the partially foamed product 5, fine cell nuclei with an average diameter of 36 $\mu$m are distributed at a density of 136 nuclei/mm$^2$ (average), and this distribution is uniform, as seen from FIG. 11.

Subsequently, the extruded partially foamed product 5 was continuously introduced into the heating oven 3 of 220° C. to decompose the residual foaming agent, whereupon the cross-linked thermoplastic resin foam 6 was continuously obtained.

A portion of the partially foamed product 5 extruded from the choke bar 23 was cut off for measurement of the residual gel weight fraction, which was found to be 57%. Further, a piece of 10 cm by 10 cm was cut out of the partially foamed product 5, and it had a thickness of 1.34 cm and a weight of 61.0 g. The density D1 of the partially foamed product was, therefore, 0.455 g/cm$^3$, and the expansion ratio M1 was 2.10. The sectional texture of the partially foamed product 5 is shown in the microphotograph of FIG. 11. In this partially foamed product 5, fine cell nuclei having an average diameter of 36 $\mu$m are distributed at a density of 136 nuclei/mm$^2$, and the distribution of the cell nuclei is uniform, as seen from FIG. 11.

Figure 12:
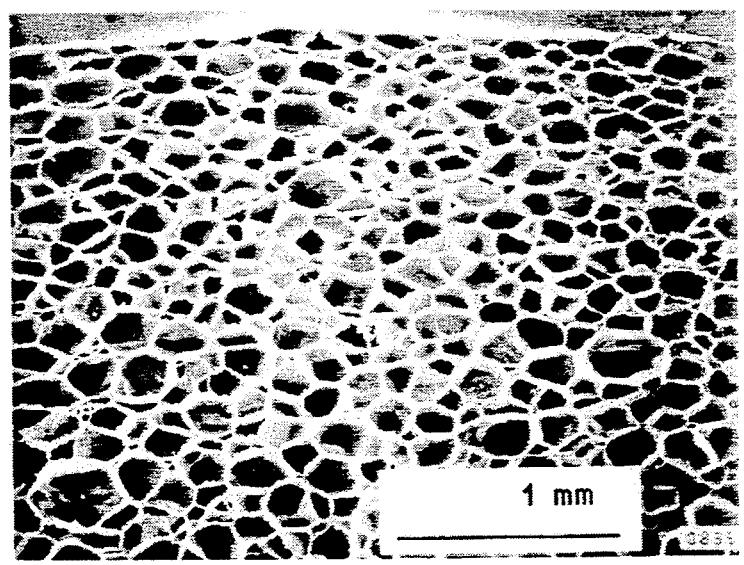
FIG. 12 shows a microphotograph of a sectional texture of the cross-linked thermoplastic resin foam.

Subsequently, the extruded partially foamed product 5 was continuously introduced into the heating oven 3 of 220° C. to decompose the residual foaming agent, whereupon the final foamed product 6 was continuously obtained. The final foamed product 6 thus obtained was a plate having a width of 33 cm and a thickness of 2.22 cm. A piece of 10 cm×10 cm was cut out of the final foamed product 6, and the weight thereof was measured, which was found to be 12.6 g. Therefore, the density D2 of the final foamed product was 0.057 g/cm$^3$, and the expansion ratio M2 was 16.8, hence M1/M2=0.125. The sectional texture of the final foamed product 6 is shown in the microphotograph of FIG. 12. In this final foamed product 6, cells having an average diameter of 130 $\mu$m are distributed, and the distribution of the cells is uniform, as seen from FIG. 12.

EXAMPLE 2

The cross-linked foam 6 was continuously manufactured by the same method as in Example 1, except that the resin composition melted and mixed in the extruder 1 contained 85 parts by weight of low-density polyethylene (MI: 1.2 g/10 min; density: 0.920 g/cm$^3$), 15 parts by weight of another low-density polyethylene (MI: 4 g/10 min; density: 0.920 g/cm$^3$), 10 parts by weight of azodicarbonamide, and 0.8 part by weight of dicumyl peroxide, and had a density of 0.958 g/cm$^3$, and that the choke bar gap was adjusted so that the overall sectional area ratio was 0.75 and the internal pressure of the die 2, measured by the pressure gauge 24, was 29 kg/cm$^2$. The partially foamed product 5 was 1.03 cm thick. A 10 cm×10 cm piece cut out of the partially foamed product 5 had a weight of 50.0 g. The density D1 of the partially foamed product was 0.485 g/cm$^3$, and the expansion ratio M1 was 1.98. The residual gel weight fraction of the partially foamed product 5 was 41%. Observation of an internal sectioned surface of the partially foamed product revealed that the average diameter and distribution density of the cell nuclei were 50 $\mu$m and 202 nuclei/mm$^2$, respectively.

The obtained cross-linked foam 6 was a plate 311 mm wide and 2.23 cm thick. A 10 cm×10 cm piece cut out of the final foamed product 6 had a weight of 13.4 g, and therefore, the density D2 was 0.060 g/cm$^3$. Thus, the expansion ratio M2 was 16.0, and the ratio M1/M2 was 0.124. A section of the final foamed product 6 was observed, and cells having an average diameter of 150 $\mu$m were uniformly distributed in the final foamed product 6.

EXAMPLE 3

The cross-linked thermoplastic resin foam 6 was continuously manufactured by the same method as in Example 1, except that the overall length of the cooling region 22 and the set temperature were 1,300 mm and 30° C., respectively. In this case, the internal pressure of the die 2 was 49 kg/cm$^2$. The partially foamed product 5 extruded on the aforesaid conditions had a thickness of 1.06 cm. A 10 cm×10 cm piece was cut out of the partially foamed product 5 and it had a weight of 61.9 g. Thus, the density D1 of the partially foamed product was 0.584 g/cm$^3$, and the expansion ratio M1 was 1.64. The residual gel weight fraction of the partially foamed product 5 was 40%. Observation of an internal sectioned surface of the partially foamed product revealed that the average diameter and distribution density of the cell nuclei were 28 $\mu$m and 228 nuclei/mm$^2$, respectively.

The obtained cross-linked foam 6 was a plate 311 mm wide and 2.26 cm thick. A 10 cm×10 cm piece cut out of the final foamed product 6 had a weight of 13.3 g, and therefore, the density D2 was 0.059 g/cm$^3$. Thus, the expansion ratio M2 was 16.2, and the ratio M1/M2 was 0.101. A section of the final foamed product 6 was observed, and cells having an average diameter of 150 $\mu$m were uniformly distributed in the final foamed product 6.

EXAMPLE 4

The cross-linked thermoplastic resin foam 6 was continuously manufactured by the same method as in Example 1, except that the resin composition melted and mixed in the extruder 1 contained 100 parts by weight of low-density polyethylene (MI: 1.2 g/10 min; density: 0.920 g/cm$^3$), 18 parts by weight of diazodicarbonamide, and 0.5 part by weight of dicumyl peroxide, and that three stages of set temperature, 150° C., 180° C., and 195° C., were arranged downstream in the heating region 21. In this case, the internal pressure of the die 2 was 40 kg/cm$^2$.

The partially foamed product 5 extruded on the aforesaid conditions had a thickness of 1.15 cm. A 10 cm×10 cm piece was cut out of the partially foamed product 5 and it had a weight of 66.2 g. Thus, the density D1 of the partially foamed product was 0.576 g/cm³, and the expansion ratio M1 was 1.71. The residual gel weight fraction of the partially foamed product 5 was 54%. Observation of an internal sectioned surface of the partially foamed product revealed that the average diameter and distribution density of the cell nuclei were 76 μm and 154 nuclei/mm², respectively.

The obtained cross-linked foam 6 was a plate 311 mm wide and 2.70 cm thick. A 10 cm×10 cm piece cut out of the final foamed product 6 had a weight of 8.9 g, and therefore, the density D2 was 0.033 g/cm³. Thus, the expansion ratio M2 was 29.9, and the ratio M1/M2 was 0.057. A section of the final foamed product 6 was observed, and cells having an average diameter of 160 μm were uniformly distributed in the final foamed product 6.

EXAMPLE 5

The cross-linked thermoplastic resin foam 6 was continuously manufactured by the same method as in Example 1, except that the throttle means 10 shown in FIGS. 9 and 10 was attached to the outlet of the cooling region 22, instead of using the choke bar, and that the bend of the tongue 12 was adjusted by means of the screws 11c and 11d so that the ratio of the sectional area of the outlet of the cooling region 22 defined by the tongue 12 to the inlet sectional area of the region 22 was 0.65. In this case, the internal pressure of the die 2 was 43 kg/cm².

The partially foamed product 5 extruded on the aforesaid conditions had a thickness of 1.05 cm. A 10 cm×10 cm piece was cut out of the partially foamed product 5 and it had a weight of 48.9 g. Thus, the density D1 of the partially foamed product was 0.466 g/cm³, and the expansion ratio M1 was 2.06. The residual gel weight fraction of the partially foamed product 5 was 54%. Observation of an internal sectioned surface of the partially foamed product revealed that the average diameter and distribution density of the cell nuclei were 52 μm and 148 nuclei/mm², respectively.

The obtained cross-linked foam 6 was a plate 311 mm wide and 2.27 cm thick. A 10 cm×10 cm piece cut out of the final foamed product 6 had a weight of 12.2 g, and therefore, the density D2 was 0.054 g/cm³. Thus, the expansion ratio M2 was 17.7, and the ratio M1/M2 was 0.116. A section of the final foamed product 6 was observed, and cells having an average diameter of 130 μm were uniformly distributed in the final foamed product 6.

EXAMPLE 6

The cross-linked foam 6 was continuously manufactured by the same method as in Example 1, except that the resin composition melted and mixed in the extruder 1 contained 100 parts by weight of ethylene-vinyl acetate copolymer (MI: 2.0 g/10 min; density: 0.930 g/cm³), 10 parts by weight of azodicarbonamide, 0.5 part by weight of dicumyl peroxide, and 0.5 part by weight of tri-methylolpropane-tri-acrylate, and had a density of 0.969 g/cm³, that the throttle means 10 shown in FIGS. 9 and 10 was attached to the outlet of the cooling region 22, instead of using the choke bar, and that the bend of the tongue 12 was adjusted by means of the screws 11c and 11d so that the ratio of the sectional area of the outlet of the cooling region 22 defined by the tongue 12 to the inlet sectional area of the region 22 was 0.50. The internal pressure of the die 2 was 20 kg/cm².

The partially foamed product 5 extruded on the aforesaid conditions was 0.98 cm thick. A 10 cm×10 cm piece cut out of the partially foamed product 5 had a weight of 37.6 g. The density D1 of the partially foamed product was 0.384 g/cm³, and thus the expansion ratio M1 was 2.52. The residual gel weight fraction of the partially foamed product 5 was 49%. Observation of an internal sectioned surface of the partially foamed product revealed that the average diameter and distribution density of the cell nuclei were 82 μm and 168 nuclei/mm², respectively.

The obtained cross-linked foam 6 was a plate 324 mm wide and 2.03 cm thick. A 10 cm×10 cm piece cut out of the final foamed product 6 had a weight of 12.2 g, and therefore, the density D2 was 0.060 g/cm³. Thus, the expansion ratio M2 was 16.2, and the ratio M1/M2 was 0.156. A section of the final foamed product 6 was observed, and cells having an average diameter of 200 μm were uniformly distributed in the final foamed product 6.

EXAMPLE 7

The cross-linked foam 6 was continuously manufactured by the same method as in Example 1, except that the resin composition melted and mixed in the extruder 1 contained 100 parts by weight of straight-chain low-density polyethylene (MI: 4.0 g/10 min; density: 0.920 g/cm³), 10 parts by weight of azodicarbonamide, 0.6 part by weight of dicumyl peroxide, and 0.5 part by weight of tri-methylolpropane-tri-acrylate, and had a density of 0.958 g/cm³, that the throttle means 10 shown in FIGS. 9 and 10 was attached to the outlet of the cooling region 22, instead of using the choke bar, and that the bend of the tongue 12 was adjusted by means of the screws 11c and 11d so that the ratio of the sectional area of the outlet of the cooling region 22 defined by the tongue 12 to the inlet sectional area of the region 22 was 0.60. The internal pressure of the die 2 was 14 kg/cm².

The partially foamed product 5 extruded on the aforesaid conditions was 0.94 cm thick. A 10 cm×10 cm piece was cut out of the partially foamed product 5 and it had a weight of 61.4 g. The density D1 of the partially foamed product was 0.653 g/cm³, and thus the expansion ratio M1 was 1.47. The residual gel weight fraction of the partially foamed product 5 was 52%. Observation of an internal sectioned surface of the partially foamed product revealed that the average diameter and distribution density of the cell nuclei were 37 μm and 200 nuclei/mm², respectively.

The obtained cross-linked foam 6 was a plate 383 mm wide and 1.98 cm thick. A 10 cm×10 cm piece cut out of the final foamed product 6 had a weight of 10.7 g, and therefore, the density D2 was 0.054 g/cm³. Thus, the expansion ratio M2 was 17.7, and the ratio M1/M2 was 0.083. A section of the final foamed product 6 was observed, and cells having an average diameter of 140 μm were uniformly distributed in the final foamed product 6.

EXAMPLE 8

The cross-linked foam 6 was continuously manufactured by the same method as in Example 1, except that the resin composition melted and mixed in the extruder 1 contained 80 parts by weight of low-density polyethylene (MI: 0.8 g/10 min; density: 0.920 g/cm$^3$), 20 parts by weight of ethylene-vinyl acetate copolymer (MI: 2.0 g/10 min; density 0.930 g/cm$^3$), 60 parts by weight of calcium carbonate powder, 5 parts by weight of azodicarbonamide, and 0.8 part by weight of dicumyl peroxide, and had a density of 1.231 g/cm$^3$, that the throttle means 10 shown in FIGS. 9 and 10 was attached to the outlet of the cooling region 22, instead of using the choke bar, and that the bend of the tongue 12 was adjusted by means of the screws 11c and 11d so that the ratio of the sectional area of the outlet of the cooling region 22 defined by the tongue 12 to the inlet sectional area of the region 22 was 0.80. The internal pressure of the die 2 was 22 kg/cm$^2$.

The partially foamed product 5 extruded on the aforesaid conditions was 0.94 cm thick. A 10 cm × 10 cm piece was cut out of the partially foamed product 5 and it had a weight of 104.1 g. The density D1 of the partially foamed product was 1.107 g/cm$^3$, and thus the expansion ratio M1 was 1.11. The residual gel weight fraction of the partially foamed product 5 was 79%. Observation of an internal sectioned surface of the partially foamed product revealed that the average diameter and distribution density of the cell nuclei were 35 μm and 198 nuclei/mm$^2$, respectively.

The obtained cross-linked foam 6 was a plate 300 mm wide and 1.69 cm thick. A 10 cm × 10 cm piece cut out of the final foamed product 6 had a weight of 25.2 g, and therefore, the density D2 was 0.149 g/cm$^3$. Thus, the expansion ratio M2 was 8.3, and the ratio M1/M2 was 0.134. A section of the final foamed product 6 was observed, and cells having an average diameter of 80 μm were uniformly distributed in the final foamed product 6.

Control 1

A cross-linked thermoplastic resin foam was manufactured in the same manner as in Example 1, except that the cooling region 22 was replaced with a straight cooling region having an outlet-to-inlet sectional area ratio of 1.0, and that the choke bar gap was adjusted so that the overall sectional area ratio was 1.0. In this case, the internal pressure of the die 2 was 5 kg/cm$^2$.

The partially foamed product 5 extruded on the aforesaid conditions had a thickness of 1.02 cm. A 10 cm × 10 cm piece was cut out of the partially foamed product 5 and it had a weight of 36.5 g. Thus, the density D1 of the partially foamed product was 0.358 g/cm$^3$, and the expansion ratio M1 was 2.68. The residual gel weight fraction of the partially foamed product 5 was 71%. Observation of an internal sectioned surface of the partially foamed product revealed that the average diameter and distribution density of the cell nuclei were 280 μm and 21 nuclei/mm$^2$, respectively.

The obtained cross-linked foam 6 was a plate having a width of 327 mm and a thickness of 1.86 cm and having a cell diameter of 390 μm. A 10 cm × 10 cm piece cut out of the final foamed product 6 had a weight of 10.2 g, and therefore, the density D2 was 0.055 g/cm$^3$. Thus, the expansion ratio M2 was 17.4, and the ratio M1/M2 was 0.154.

Control 2

A partially foamed product was extruded in the same manner as in Control 1, except that the choke bar gap was adjusted so that the overall sectional area ratio was 0.95, and that the temperature of the cooling region 22 was set at 100° C. In this case, the partially foamed product swelled drastically, thereby causing cracks in the surface, when it was pushed out through the outlet of the choke bar. Further, the internal pressure of the die 2 varied considerably, so that it was difficult to extrude the partially foamed product with stability.

Control 3

A cross-linked thermoplastic resin foam was manufactured in the same manner as in Control 1, except that the temperature of the heating region 21 was kept constant at 170° C. In this case, the internal pressure of the die 2 was 7 kg/cm$^2$.

The partially foamed product 5 extruded on the aforesaid conditions was 1.01 cm thick. A 10 cm × 10 cm piece was cut out of the partially foamed product 5 and it had a weight of 93.4 g. The density D1 of the partially foamed product was 0.925 g/cm$^3$, and thus the expansion ratio M1 was 1.04. The residual gel weight fraction of the partially foamed product 5 was 0%. Observation of a sectional surface of the partially foamed product revealed that the average diameter and distribution density of the cell nuclei were 357 μm and 2 nuclei/mm$^2$, respectively.

The obtained cross-linked foam 6 was a plate having a width of 330 mm and a thickness of 2.20 cm and having a cell diameter of 1300 μm. A 10 cm × 10 cm piece cut out of the final foamed product 6 had a weight of 11.7 g, and therefore, the density D2 was 0.053 g/cm$^3$. Thus, the expansion ratio M2 was 18.1, and the ratio M1/M2 was 0.057.

Since the partially foamed product did not have fine cell nuclei distributed at high density, the resulting cross-linked foam had a cell diameter as large as 1300 μm.

Control 4

A partially foamed product was extruded in the same manner as in Control 1, except that three stages of set temperature, 160° C., 190° C., and 210° C., were arranged downstream in the heating region 21.

The state of a swell of the partially foamed product at the outlet of the choke bar was unstable, so that the molded product failed to be extruded straight, and its surface was cracked even though it was extruded, that is, the extrusion was extremely unstable. Thus, the partially foamed product was unable to be continuously introduced into the heating oven.

The partially foamed product obtained was unevenly expanded. Part of the partially foamed product was cut off and heated to 220° C. to be expanded under the atmospheric pressure. The resulting partially foamed product 5 had a thickness of 1.90 cm. A 10 cm × 10 cm piece was cut out of the partially foamed product 5 and it had a weight of 10.1 g. The density D1 of the partially foamed product was 0.053 g/cm$^3$, and thus the expansion ratio M1 was 18.1. The residual gel weight fraction of the partially foamed product 5 was 43%. Observation of an internal sectioned surface of the partially foamed product revealed that the average diameter and distribution density of the cell nuclei were 150 μm and 44 nuclei/mm$^2$, respectively.

The obtained cross-linked foam 6 had a cell diameter of 160 μm. A 10 cm × 10 cm piece cut out of the final foamed product 6 had a weight of 10.2 g, and therefore, the density D2 was 0.048 g/cm$^3$. Thus, the expansion ratio M2 was 20.0, and the ratio M1/M2 was 0.905.

Another part of the partially foamed product was cut off and heated to 220° C. to be expanded under the atmospheric pressure. The resulting partially foamed product 5 had a thickness of 1.86 cm. A 10 cm × 10 cm piece was cut out of the partially foamed product 5 and it had a weight of 10.6 g. The density D1 of the partially foamed product was 0.057 g/cm³, and thus the expansion ratio M1 was 16.8. The residual gel weight fraction of the partially foamed product 5 was 40%. Observation of an internal sectioned surface of the partially foamed product revealed that the average diameter and distribution density of the cell nuclei were 184 μm and 29 nuclei/mm², respectively.

A 10 cm×10 cm piece was cut out of the thus-obtained final cross-linked foam 6 and it had a weight of 11.6 g and a cell diameter of 344 μm. The density D2 of the final foam product was 0.052 g/cm³, and the expansion ratio M2 was 18.4. Thus, the ratio M1/M2 was 0.913.

Since these parts of the partially foamed product failed to fulfill the condition M1/M2≦0.525 (5.00≧ M1≧1.05, M2≧2), the extrusion was extremely unstable.

Control 5

A cross-linked foam was manufactured by the same method as in Example 1, except that the length of the cooling region 22 was 10 cm. The extruded partially foamed product had a surface temperature of 55° C. and a core temperature of 96° C. In this case, the internal pressure of the die 2, measured by the pressure gauge 24, was 25 kg/cm².

The partially foamed product 5 extruded on the aforesaid conditions was 1.60 cm thick. A 10 cm×10 cm piece was cut out of the partially foamed product 5 and it had a weight of 55.8 g. The density D1 of the partially foamed product was 0.349 g/cm³, and thus the expansion ratio M1 was 2.75. In this partially foamed product, the cell nuclei formed in the surface region were quite different from those formed in the central part, and part of the surface region was swollen. Specifically, the cell nuclei in the surface region had a diameter of 100 μm and a density of 19 nuclei/mm², and the cell nuclei in the central part had a diameter of 190 μm and a density of 28 nuclei/mm². This partially foamed product having uneven cells was heated to 220° C. to be expanded under the atmospheric pressure. The resulting foam had a thickness of 1.88 cm. A 10 cm×10 cm piece was cut out of the thus-foamed product and it had a weight of 11.7 g. Therefore the final foamed product had a density D2 of 0.062 g/cm³ and an expansion ratio M2 of 15.5, and the ratio M1/M2 was 0.177. The interior of the obtained foam was uneven and the distribution of cell diameters along the thickness direction was 200 to 400 μm.

Control 6

A cross-linked foam was manufactured by the same method as in Control 1, except that three stages of set temperature, 160° C., 185° C., and 200° C., were arranged downstream in the heating region 21. In this case, the state of a swell of the foam at the outlet of the choke bar was unstable, and its surface was cracked even though it was extruded, that is, the extrusion was extremely unstable. Thus, the partially foamed product was unable to be continuously introduced into the heating oven. The resulting partially foamed product was unevenly expanded.

Part of the partially foamed product was cut off and heated to 220° C. to be expanded in the atmospheric pressure. The resulting partially foamed product was 1.54 cm thick. A 10 cm×10 cm piece was cut out of the partially foamed product 5 and it had a weight of 20.2 g. The density D1 of the partially foamed product was 0.131 g/cm³, and thus the expansion ratio M1 was 7.31.

The residual gel weight fraction of the partially foamed product 5 was 48%. Observation of an internal sectioned surface of the partially foamed product revealed that the average diameter and distribution density of the cell nuclei were 100 μm and 20 nuclei/mm², respectively.

Further, a 10 cm×10 cm piece was cut out of the thus-obtained cross-linked foam 6 and it had a weight of 12.8 g. Thus, the final foamed product had a density D2 of 0.058 g/cm³ and an expansion ratio M2 of 16.5, and the ratio M1/M2 was 0.443.

Since these cut parts failed to fulfill the condition 5.00≦M1≦1.05, the extrusion was extremely unstable.

Control 7

A cross-linked foam was manufactured by the same method as in Example 1, except that a pressure gauge was arranged at the head 1a of the extruder, that the ratio of the sectional area of the outlet of the cooling region 22 to the inlet sectional area of the region 22 was 0.90, and that the choke bar gap was adjusted so that the overall sectional area ratio was 0.80. In this case, the pressure gauge arranged at the head 1a showed 37 kg/cm², and the internal pressure of the die 2 was 4 kg/cm².

The partially foamed product 5 extruded on the aforesaid conditions was 0.94 cm thick. A 10 cm×10 cm piece was cut out of the partially foamed product 5 and it had a weight of 41.9 g. The density D1 of the partially foamed product was 0.445 g/cm³, and thus the expansion ratio M1 was 2.51. The residual gel weight fraction of the partially foamed product was 61%. Observation of an internal sectioned surface of the partially foamed product revealed that the average diameter and distribution density of the cell nuclei were 184 μm and 36 nuclei/mm², respectively.

The obtained cross-linked foam 6 was a plate 293 mm wide and 1.97 cm thick. A 10 cm×10 cm piece was cut out of the final foamed product 6 and it had a weight of 10.4 g, and therefore, the density D2 was 0.053 g/cm³. Thus, the expansion ratio M2 was 18.1, and the ratio M1/M2 was 0.139. The interior of the cross-linked foam had an average cell diameter of 344 μm. Since the internal pressure of the die 2, measured by the pressure gauge arranged at the die 2 in which the foaming agent is decomposed, was 4 kg/cm², though the pressure gauge arranged at the head 1a showed 37 kg/cm², fine cell nuclei could not be formed, and the cross-linked foam 6, and thus the final foamed product, exhibited large cell diameters.

What is claimed is:

1. A method for continuously manufacturing a cross-linked thermoplastic resin foam, comprising:
   extruding a resin composition into a closed die, said resin composition containing at least a thermoplastic resin, a foaming agent, and a cross-linking agent, said die including at least a molding region, a heating region, and a cooling region, continuously arranged in the order named;
   molding said resin composition into a desired shape in said molding region of said die;
   heating said resin composition in said heating region of said die to decompose said cross-linking agent and also to decompose 20 to 95% of said foaming agent so that cell nuclei are produced, thereby forming a partially foamed product;
   cooling said partially foamed product to a temperature lower than the softening point thereof in said cooling region of said die, thereby increasing the rigidity of said partially foamed product, and extruding said partially foamed product, moving in said cooling region, to the outside of said die while applying a damping force to said partially foamed product; and heating the extruded partially foamed product under atmospheric pressure to complete the decomposition of the foaming agent and the expansion of the extruded partially foamed product, thereby continuously obtaining a final product.

2. The method for continuously manufacturing a cross-linked thermoplastic resin foam according to claim 1, wherein said resin composition is partially expanded so that a relationship of $$M1/M2 \leq 0.525 (5.00 \geq 1.05, M2 \geq 2.00)$$

is fulfilled, where M1 and M2 are the expansion ratios of said partially foamed product and said final product, respectively, and are defined as D0/D1 and D0/D2, respectively, assuming that the densities of the resin composition, the partially foamed product, and the final product are D0, D1 and D2, respectively.

3. The method for continuously manufacturing a cross-linked thermoplastic resin foam according to claim 2, wherein said resin composition is partially expanded so that there is a relation $0.05 \leq M1/M2 \leq 0.35$ between said values M1 and M2.

4. The method for continuously manufacturing a cross-linked thermoplastic resin foam according to claim 1, wherein said resin composition is extruded into said die so that the internal pressure of said die in said heating region ranges from 10 to 70 kgf/cm$^2$.

5. The method for continuously manufacturing a cross-linked thermoplastic resin foam according to claim 1, wherein said thermoplastic resin is polyolefin.

* * * * *

UNITED STATES PATENT AND TRADEMARK OFFICE
CERTIFICATE OF CORRECTION

PATENT NO. : 5,310,513

DATED : May 10, 1994

INVENTOR(S) : Yamamoto et al

It is certified that error appears in the above-indentified patent and that said Letters Patent is hereby corrected as shown below:

Title page, left column, [56] References Cited, under U.S. PATENT DOCUMENTS, insert:
```
--4,626,183    12/1986    Shirai et al    264/461
  4,201,534    5/1980     Phipps          264/51--.
```

Title page, right column, under FOREIGN PATENT DOCUMENTS, insert:
```
--0 282 848    9/1988     Europe
  2 092 000    1/1972     France--.
```

Title page, right column, after "2-283421  11/1990 Japan", insert:
--OTHER PUBLICATIONS
WORLD PATENTS INDEX LATEST
Section Ch, Week 9101
Derwent Publications Ltd., London, GB;
Class A, AN 91-004894
& JP-A-2 283 421 (FURUKAWA ELECTRIC CO)
* abstract; figures 1-3 *--.

Signed and Sealed this

Twenty-fifth Day of June, 1996

Attest:

BRUCE LEHMAN

*Attesting Officer*      *Commissioner of Patents and Trademarks*